(12) United States Patent
Doyle

(10) Patent No.: US 7,411,610 B2
(45) Date of Patent: Aug. 12, 2008

(54) METHOD AND SYSTEM FOR GENERATING DETAIL-IN-CONTEXT VIDEO PRESENTATIONS USING A GRAPHICAL USER INTERFACE

(75) Inventor: Michael Doyle, Vancouver (CA)

(73) Assignee: Idelix Software Inc., Vancouver (CA)

( * ) Notice: Subject to any disclaimer, the term of this patent is extended or adjusted under 35 U.S.C. 154(b) by 1071 days.

(21) Appl. No.: 10/435,675

(22) Filed: May 12, 2003

(65) Prior Publication Data

US 2003/0227556 A1 Dec. 11, 2003

(30) Foreign Application Priority Data

May 15, 2002 (CA) .................................... 2386560

(51) Int. Cl.
H04N 5/232 (2006.01)
(52) U.S. Cl. ................... 348/211.8; 348/143; 348/218.1
(58) Field of Classification Search ................. 348/143,
348/63, 333.02, 211.13, 211.14, 239, 333.11,
348/333.12, 333.03, 333.01, 157, 159, 333.05,
348/211.11, 211.12, 211.8, 211.5, 211.9,
348/149, 150, 153, 161; 345/650, 657, 641,
345/649, 619, 647, 660, 661, 629; 715/701,
715/715, 726, 782, 797, 815, 861, 781, 848,
715/802, 801, 800, 763, 767, 864, 866, 851
See application file for complete search history.

(56) References Cited

U.S. PATENT DOCUMENTS

| | | | |
|---|---|---|---|
| 4,581,647 A | 4/1986 | Vye | |
| 4,630,110 A | 12/1986 | Cotton et al. | |
| 4,790,028 A | 12/1988 | Ramage | |
| 4,992,866 A | 2/1991 | Morgan | |
| 5,200,818 A | 4/1993 | Neta et al. | |
| 5,206,721 A * | 4/1993 | Ashida et al. | ............... 348/14.1 |
| 5,258,837 A | 11/1993 | Gormley | |
| 5,521,634 A | 5/1996 | McGary | |
| 5,523,783 A | 6/1996 | Cho | |

(Continued)

FOREIGN PATENT DOCUMENTS

CA 2386560 A1 * 11/2003

OTHER PUBLICATIONS

Carpendale, Marianne S. T., "A Framework for Unifying Presentation Space", M.S.T. Carpendale and Catherine Montagnese, University of Calgary, UIST 2001, pp. 61-70.*

(Continued)

*Primary Examiner*—Nhan T Tran
*Assistant Examiner*—Nelson D Hernández
(74) *Attorney, Agent, or Firm*—Joseph Conneely; McCarthy Tetrault LLP

(57) ABSTRACT

A method for generating a presentation of a region-of-interest in an image of a scene. The method includes the steps of capturing the image of the scene with a first camera and displaying the image of the scene on a display screen; selecting the region-of-interest within the image of the scene with a cursor and a pointing device; controlling a second camera to capture an image of a region of the scene corresponding to the region-of-interest; inserting the image of the region into the region-of-interest in the image of the scene to generate the presentation; and, displaying the presentation on the display screen.

22 Claims, 9 Drawing Sheets

U.S. PATENT DOCUMENTS

| | | | |
|---|---|---|---|
| 5,528,289 | A | 6/1996 | Cortjens et al. |
| 5,594,859 | A | 1/1997 | Palmer et al. |
| 5,610,653 | A | 3/1997 | Abecassis |
| 5,613,032 | A | 3/1997 | Cruz et al. |
| 5,638,523 | A * | 6/1997 | Mullet et al. ............... 715/855 |
| 5,657,246 | A | 8/1997 | Hogan et al. |
| 5,745,166 | A | 4/1998 | Rhodes et al. |
| 5,786,814 | A | 7/1998 | Moran et al. |
| 5,808,670 | A | 9/1998 | Oyashiki et al. |
| 5,818,455 | A * | 10/1998 | Stone et al. ............... 345/619 |
| 5,872,922 | A | 2/1999 | Hogan et al. |
| 5,923,364 | A | 7/1999 | Rhodes et al. |
| 5,926,209 | A | 7/1999 | Glatt |
| 6,091,771 | A | 7/2000 | Seeley et al. |
| 6,266,082 | B1 | 7/2001 | Yonezawa et al. |
| 6,337,709 | B1 | 1/2002 | Yamaashi et al. |
| 6,346,962 | B1 | 2/2002 | Goodridge |
| 6,542,191 | B1 | 4/2003 | Yonezawa |
| 6,919,921 | B1 * | 7/2005 | Morota et al. .......... 348/211.11 |
| 7,071,971 | B2 * | 7/2006 | Elberbaum ............. 348/211.11 |
| 2001/0040636 | A1 * | 11/2001 | Kato et al. ............. 348/333.03 |

OTHER PUBLICATIONS

Carpendale, M. S. T., A Framwork For Elastic Presentation Space, Simon Fraser University, Mar. 1999.

* cited by examiner

METHOD AND SYSTEM FOR GENERATING DETAIL-IN-CONTEXT VIDEO PRESENTATIONS USING A GRAPHICAL USER INTERFACE

This application claims priority from Canadian Patent Application No. 2,386,560 filed May 15, 2002, the disclosure of which is incorporated herein by reference.

FIELD OF THE INVENTION

The invention relates to the field of video camera control and image display, and more specifically to a method and system for generating detail-in-context video presentations using a graphical user interface ("GUI").

BACKGROUND OF THE INVENTION

Video camera control and image display systems are used in a variety of applications including video conferencing, security systems, and plant monitoring systems. In a typical video camera system, images of locations, objects, or persons captured by one or more video cameras are displayed to a user on one or more remote computer display screens or television monitors. In these systems, the cameras are not always fixed. For example, cameras which are capable of panning, tilting, and zooming may be used. A user may pan or tilt a camera to monitor a different scene or may zoom a camera to observe selected area of a scene in more detail.

One disadvantage of these video camera systems is that when a camera pans, tilts, or zooms, the user may find it difficult to determine what portion of a location or object he is observing. In other words, while the user may have gained a detailed view of a region of the location or object that is of interest to him, he may lose sight of the context within which that region is positioned.

One solution to this problem is to use multiple display screens. For example, a first display screen may show an image of an entire scene as captured by a first camera while a second display screen, spaced from the first, may show an expanded image of a region of the entire scene as captured by a second camera. However, this solution is costly as it requires the use to two display screens and the space necessary to locate them.

A different solution to this problem is to use a single display screen on which the images from two or more cameras may be displayed. In typically security systems, for example, a single monitor may display images from sixteen cameras in a four-by-four array. This is achieved by performing an image reduction process on each source image to reduce its size. As another example, in typical television monitors, picture-in-picture techniques may be used to display two video images simultaneously. However, these solutions are also costly as they require the use of relatively large display screens in order to present the multiple images at a size that is comfortable for user viewing.

Thus, with a single display screen, the images displayed will be relatively small even though the display screen will generally be chosen to be relatively large, whereas with a number of separate display screens, the images will generally be relatively large but spaced from the user even though the individual display screens may be relatively small. Such solutions therefore generally involve the striking of a compromise between having the system as a whole small enough for all the images to be readily observable by the user without inconvenience, and having the individual images large enough for small details to be readily observable.

In any event, with either solution, the relationship between images of the full scene and regions-of-interest in that full scene may be lost to a user. This is often referred to as the "screen real estate problem".

In addition, video camera systems generally provide for the remote control of video cameras. The terms pan, tilt, zoom and focus are industry standards which define the four major axes for which a camera may be adjusted. Traditional video camera systems provide for rather rudimentary control of these camera functions. That is, the user has a control panel for manually controlling camera functions, such as buttons for up/down, left/right, zoom in/out, and focus. The user can also typically select one of several preset camera settings so that, by the press of a single button, a camera will automatically position and focus itself at some preselected target or region-of-interest. Of course, the preset function requires planning because the camera must be manually adjusted for the preset, and then the settings stored. The preset button then merely recalls these settings and adjusts the camera accordingly. If a location has not been preset, then the user must manually adjust the pan, tilt, zoom, and focus settings for that location.

However, these controls are not intuitively obvious or easy to use, partly because the user may think that the camera should pan in one direction to center an object whereas, because of the of the camera with respect to the user and the region-of-interest, the camera should actually move in the opposite direction. When the system has multiple cameras which are subject to control by the user, typical systems require the user to use buttons on the control keyboard to manually select the camera to be controlled, and/or assigning separate keys to separate cameras. Frequently, the user will select the wrong camera, or adjust the wrong camera. These problems are pronounced in two camera systems when a user has the lost the context of the region-of-interest as captured by one camera within the full scene as captured by a second camera.

A need therefore exists for a video display system that can effectively display both an image of a full scene (i.e. a context image) as captured by a first camera and an image of a region-of-interest (i.e. a detail image) within that full scene as captured by a second camera. A further need exists for a video camera control system that can effectively control cameras for capturing detail and context images. Consequently, it is an object of the present invention to obviate or mitigate at least some of the above mentioned disadvantages.

SUMMARY OF THE INVENTION

In general, the present invention provides a method and system for generating detail-in-context video presentations by combining detail and context video images from separate video cameras using a GUI for both controlling the video cameras to capture the detail and context video images and for specifying the parameters of the combined video presentation.

According to one aspect of the invention, there is provided a method for generating a presentation of a region-of-interest in an image of a scene. The method includes the steps of: capturing the image of the scene with a first camera and displaying the image of the scene on a display screen; selecting the region-of-interest within the image of the scene with a cursor and a pointing device; controlling a second camera to capture an image of a region of the scene corresponding to the region-of-interest; inserting the image of the region into the region-of-interest in the image of the scene to generate the presentation; and, displaying the presentation on the display screen.

Preferably, the step of controlling further includes the steps of: displaying a graphical user interface ("GUI") over the region-of-interest on the display screen, wherein the GUI includes magnify, resize, and move areas, zooming the second camera when the magnify area is selected and repositioned by the pointing device; adjusting the second camera's field of view when the resize area is selected and repositioned by the pointing device and panning and/or tilting the second camera when the move area is selected and repositioned by the pointing device.

Preferably, the method further includes the steps of creating a lens surface for the region-of-interest; and, transforming the image of the region by applying a distortion function defining the lens surface to the image of the region.

Advantageously, by using the two cameras to supply data to a detail-in-context presentation a user can view a full scene while focusing in on a smaller area of the scene. This makes it possible for a user to closely observe objects or persons in the full scene without losing visibility or context of what is happening in the scene surrounding that object or person.

BRIEF DESCRIPTION OF THE DRAWINGS

Embodiments of the invention may best be understood by referring to the following description and accompanying drawings. In the description and drawings, like numerals refer to like structures or processes. In the drawings.

DETAILED DESCRIPTION OF THE PREFERRED EMBODIMENTS

Figure 1:
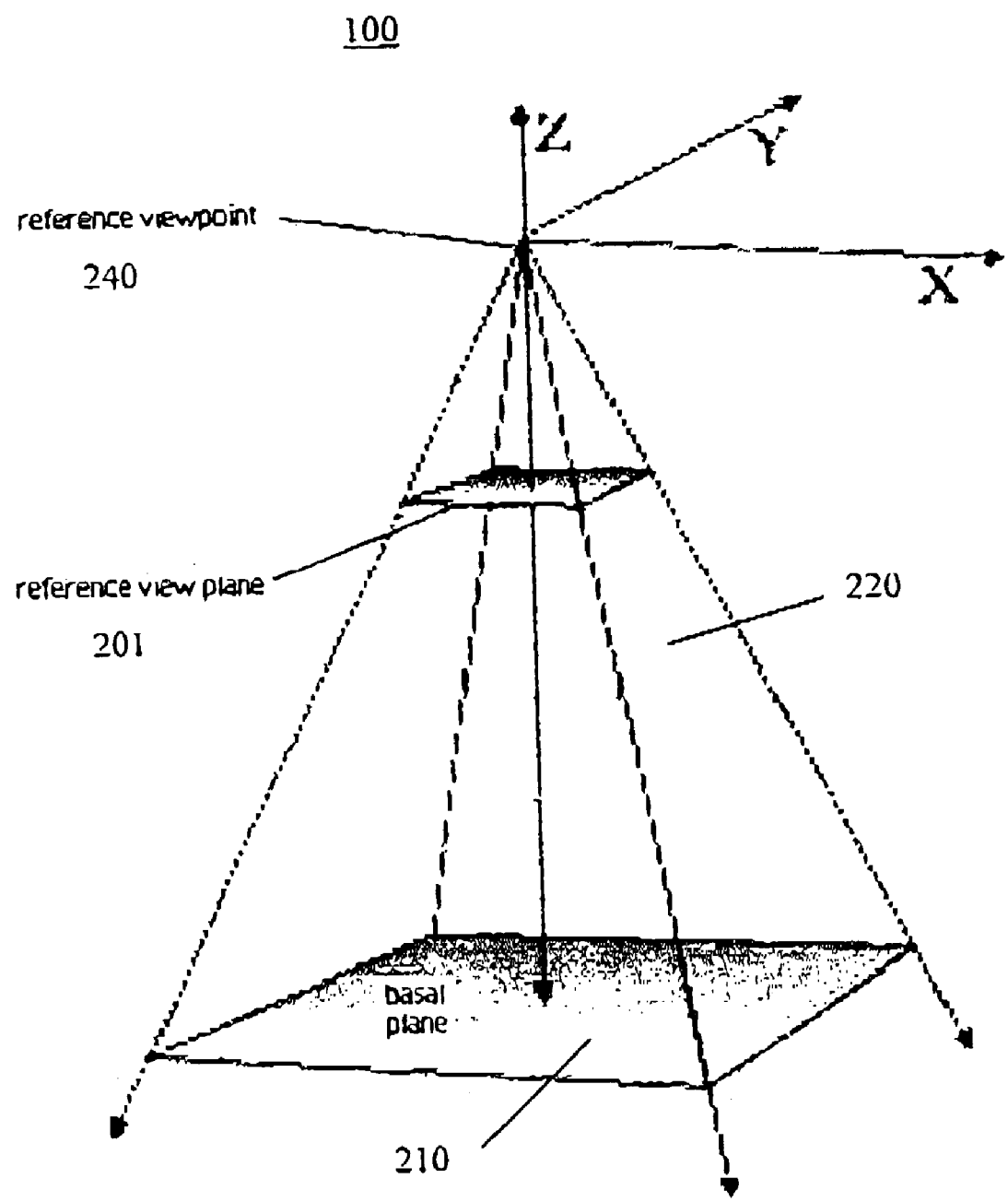
FIG. 1 is a graphical representation of the geometry for constructing a three-dimensional (3D) perspective viewing frustum, relative to an x, y, z coordinate system, in accordance with known elastic presentation space graphics technology.

In the following description, numerous specific details are set forth to provide a thorough understanding of the invention. However, it is understood that the invention may be practiced without these specific details. In other instances, well-known software, circuits, structures and techniques have not been described or shown in detail in order not to obscure the invention. The term "data processing system" is used herein to refer to any machine for processing data, including the computer systems and network arrangements described herein.

As discussed above, the "screen real estate problem" generally arises whenever large amounts of information is to be displayed on a display screen of limited size. As discussed, well-known solutions to this problem include panning and zooming, or combinations thereof. While these solutions are suitable for a large number of visual display applications, including the display to video images, these solutions become less effective where sections of the visual information are spatially related, such as maps, three-dimensional representations, newspapers and such like. In this type of information display, panning and zooming are not as effective as much of the context of the panned or zoomed display is hidden.

A recent solution to this problem is the application of "detail-in-context" presentation techniques. Detail-in-context is the magnification of a particular region-of-interest (the "focal region" or "detail") in a data presentation while preserving visibility of the surrounding information (the "context"). This technique has applicability to the display of large surface area media, including video images captured by video cameras, on computer screens of variable size including graphics workstations, laptop computers, personal digital assistants ("PDAs"), and cell phones.

In the detail-in-context discourse, differentiation is often made between the terms "representation" and "presentation". A representation is a formal system, or mapping for specifying raw information or data that is stored in a computer or data processing system. For example, a digital map of a city is a representation of raw data including street names and the relative geographic location of streets and utilities. Such a representation may be displayed visually on a computer screen or printed on paper. On the other hand, a presentation is a spatial organization of a given representation that is appropriate for the task at hand. Thus, a presentation of a representation organizes such things as the point of view and the relative emphasis of different parts or regions of the representation. For example, a digital map of a city may be presented with a region magnified to reveal street names.

In general, a detail-in-context presentation may be considered as a distorted view (or distortion) of a portion of the original representation where the distortion is the result of the application of a "lens" like distortion function to the original representation. A detailed review of various detail-in-context presentation techniques such as "Elastic Presentation Space" ("EPS") (or "Pliable Display Technology" ("PDT")) may be found in a publication by Marianne S. T. Carpendale, entitled "A Framework for Elastic Presentation Space" (Carpendale, Marianne S. T., *A Framework for Elastic Presentation Space* (Burnaby, British Columbia: Simon Fraser University, 1999)), and incorporated herein by reference.

In general, detail-in-context data presentations are characterized by magnification of areas of an image where detail is desired, in combination with compression of a restricted range of areas of the remaining information (i.e. the context), the result typically giving the appearance of a lens having been applied to the display surface. Using the techniques described by Carpendale, points in a representation are displaced in three dimensions and a perspective projection is used to display the points on a two-dimensional presentation display. Thus, when a lens is applied to a two-dimensional continuous surface representation, for example, the resulting presentation appears to be three-dimensional. In other words, the lens transformation appears to have stretched the continuous surface in a third dimension. In EPS graphics technology, a two-dimensional visual representation is placed onto a surface; this surface is placed in three-dimensional space; the surface, containing the representation, is viewed through perspective projection; and the surface is manipulated to effect the reorganization of image details. The presentation transformation is separated into two steps: surface manipulation or distortion and perspective projection.

FIG. 1 is a graphical representation 100 of the geometry for constructing a three-dimensional ("3D") perspective viewing frustum 220, relative to an x, y, z coordinate system in accordance with known elastic presentation space (EPS) graphics technology. In EPS technology, detail-in-context views of two-dimensional ("2D") visual representations are created with sight-line aligned distortions of a 2D information presentation surface within a 3D perspective viewing frustum 220. In EPS, magnification of regions of interest and the accompanying compression of the contextual region to accommodate this change in scale are produced by the movement of regions of the surface towards the viewpoint ("VP") 240 located at the apex of the pyramidal shape 220 containing the frustum. The process of projecting these transformed layouts via a perspective projection results in a new 2D layout which includes the zoomed and compressed regions. The use of the third dimension and perspective distortion to provide magnification in EPS provides a meaningful metaphor for the process of distorting the information presentation surface. The 3D manipulation of the information presentation surface in such a system is an intermediate step in the process of creating a new 2D layout of the information.

Figure 2:
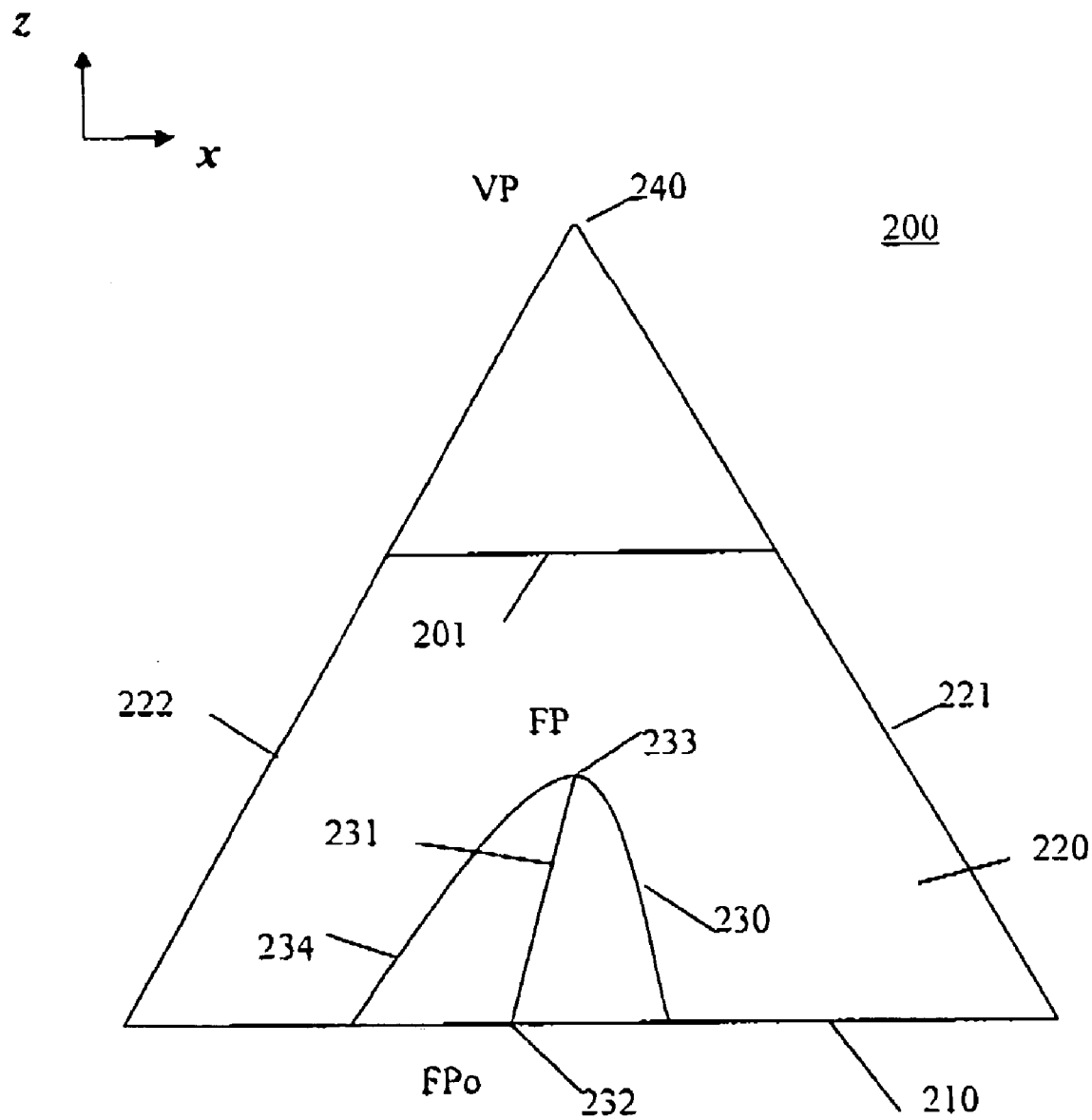
FIG. 2 is a graphical representation of the geometry of a presentation in accordance with known elastic presentation space graphics technology.

FIG. 2 is a graphical representation 200 of the geometry of a presentation in accordance with known EPS graphics technology. EPS graphics technology employs viewer-aligned perspective projections to produce detail-in-context presentations in a reference view plane 201 which may be viewed on a display. Undistorted 2D data points are located in a basal plane 110 of a 3D perspective viewing volume or frustum 220 which is defined by extreme rays 221 and 222 and the basal plane 210. The VP 240 is generally located above the centre point of the basal plane 210 and reference view plane ("RVP") 201. Points in the basal plane 210 are displaced upward onto a distorted surface 230 which is defined by a general 3D distortion function (i.e. a detail-in-context distortion basis function). The direction of the viewer-aligned perspective projection corresponding to the distorted surface 230 is indicated by the line FPo-FP 231 drawn from a point FPo 232 in the basal plane 210 through the point FP 233 which corresponds to the focus or focal region or focal point of the distorted surface 230.

EPS is applicable to multidimensional data and is well suited to implementation on a computer for dynamic derail-in-context display on an electronic display surface such as a monitor. In the case of two dimensional data, EPS is typically characterized by magnification of areas of an image where detail is desired 233, in combination with compression of a restricted range of areas of the remaining information (i.e. the context) 234, the end result typically giving the appearance of a lens 230 having been applied to the display surface. The areas of the lens 230 where compression occurs may be referred to as the "shoulder" 234 of the lens 230. The area of the representation transformed by the lens may be referred to as the "lensed area". The lensed area thus includes the focal region and the shoulder. To reiterate, the source image or representation to be viewed is located in the basal plane 210. Magnification 233 and compression 234 are achieved through elevating elements of the source image relative to the basal plane 210, and then projecting the resultant distorted surface onto the reference view plane 201. EPS performs detail-in-context presentation of n-dimensional data through the use of a procedure wherein the data is mapped into a region in an (n+1) dimensional space, manipulated through perspective projections in the (n+1) dimensional space, and then finally transformed back into n-dimensional space for presentation. EPS has numerous advantages over conventional zoom, pan, and scroll technologies, including the capability of preserving the visibility of information outside 234 the local region of interest 233.

For example, and referring to FIGS. 1 and 2A in two dimensions, EPS can be implemented through the projection of an image onto a reference plane 201 in the following manner. The source image or representation is located on a basal plane 210, and those regions of interest 233 of the image for which magnification is desired are elevated so as to move them closer to a reference plane situated between the reference viewpoint 240 and the reference view plane 201. Magnification of the focal region 233 closest to the RVP 201 varies inversely with distance from the RVP 201. As shown in FIGS. 1 and 2, compression of regions 234 outside the focal region 233 is a function of both distance from the RVP 201, and the gradient of the function describing the vertical distance from the RVP 201 with respect to horizontal distance from the focal region 233. The resultant combination of magnification 233 and compression 234 of the image as seen from the reference viewpoint 240 results in a lens-like effect similar to that of a magnifying glass applied to the image. Hence, the various functions used to vary the magnification and compression of the source image via vertical displacement from the basal plane 210 are described as lenses, lens types, or lens functions. Lens functions that describe basic lens types with point and circular focal regions, as well as certain more complex lenses and advanced capabilities such as folding, have previously been described by Carpendale.

Figure 3:
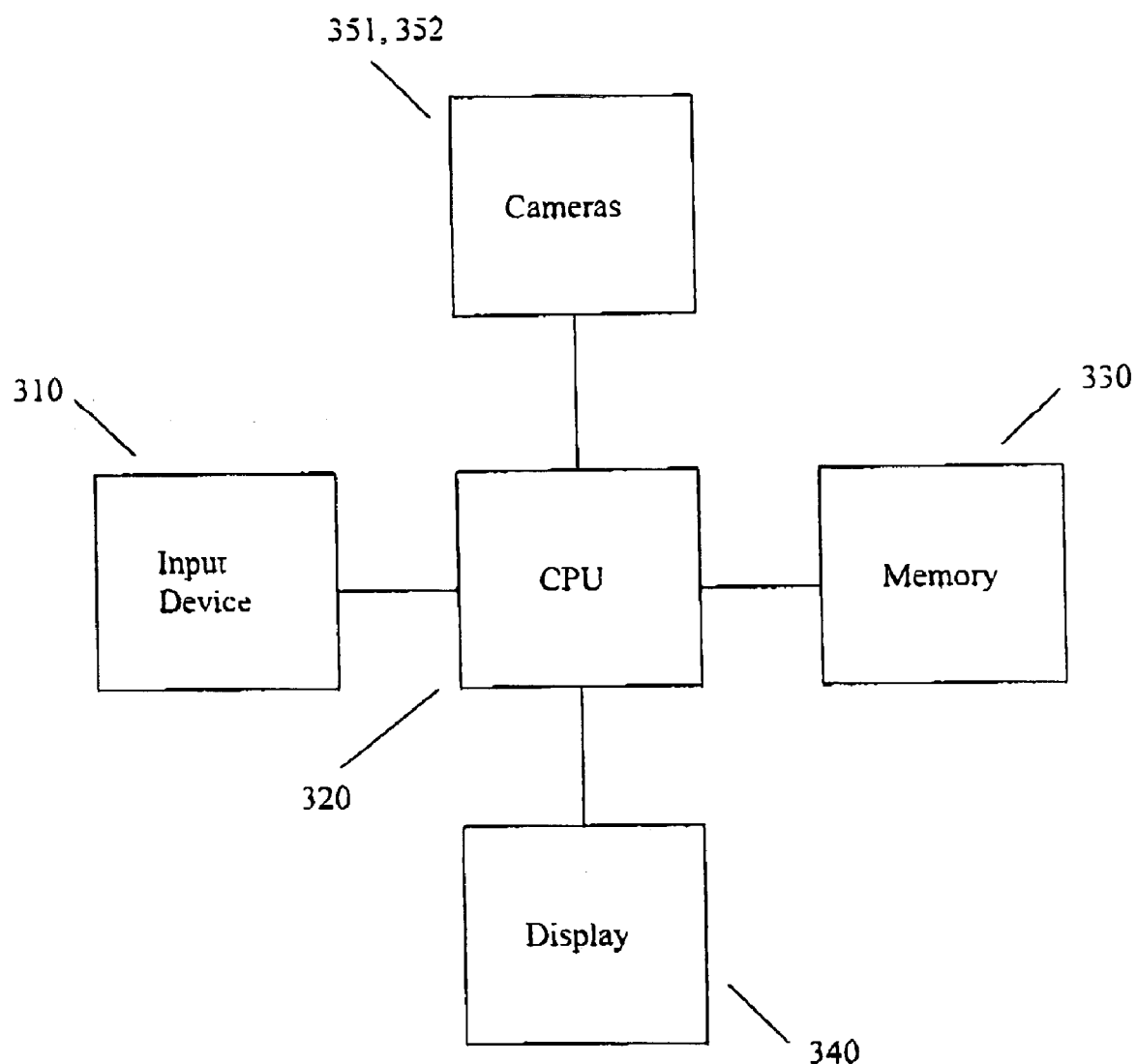
FIG. 3 is a block diagram illustrating a data processing system adapted for implementing an embodiment of the invention.

System FIG. 3 is a block diagram of a data processing system 300 adapted to implement an embodiment of the invention. The data processing system is suitable for implementing EPS technology, for controlling video cameras, and for displaying video images in conjunction with a detail-in-context graphical user interface ("GUI"). The data processing system 300 includes an input device 310, a central processing unit or CPU 320, memory 330, a display 340, and cameras 351, 352. The input device 310 may include a keyboard, mouse, trackball, or similar device. The CPU 320 may include dedicated coprocessors and memory devices. The memory 330 may include RAM, ROM, databases, or disk devices. The display 340 may include a computer screen, terminal device, or a hardcopy producing output device such as a printer or plotter. And, the cameras 351, 352 may include camera control logic, camera control interfaces, focusing lens systems, 200 m/field of view lens systems, panning systems, and tilt systems, all housed in a suitable camera body and/or base. The design of camera control logic, camera control interfaces, focusing systems, 200 m systems, panning systems, and tilt systems, and the cameras themselves, are well known in the art, The focusing lens system may be of the auto-focusing variety requiring little or no user control. The data processing system 300 has stored therein data representing sequences of instructions which when executed cause the method described herein to be performed. Of course, the data processing system 300 may contain additional software and hardware a description of which is not necessary for understanding the invention.

In accordance with the present invention, detail-in-context data viewing techniques are applied to data captured by multiple video cameras 351, 352. In addition, detail-in-context data viewing techniques are used to control multiple cameras in a video camera data processing system 300. Detail-in-context data viewing techniques allow a user to view multiple levels of detail or resolution on one display 340. The appearance of the data display or presentation is that of a virtual lens showing detail 233 within the context of a larger area view 210. These techniques can be used to present information from multiple cameras 351, 352 that capture images at different resolutions, in the same presentation.

Figure 5:
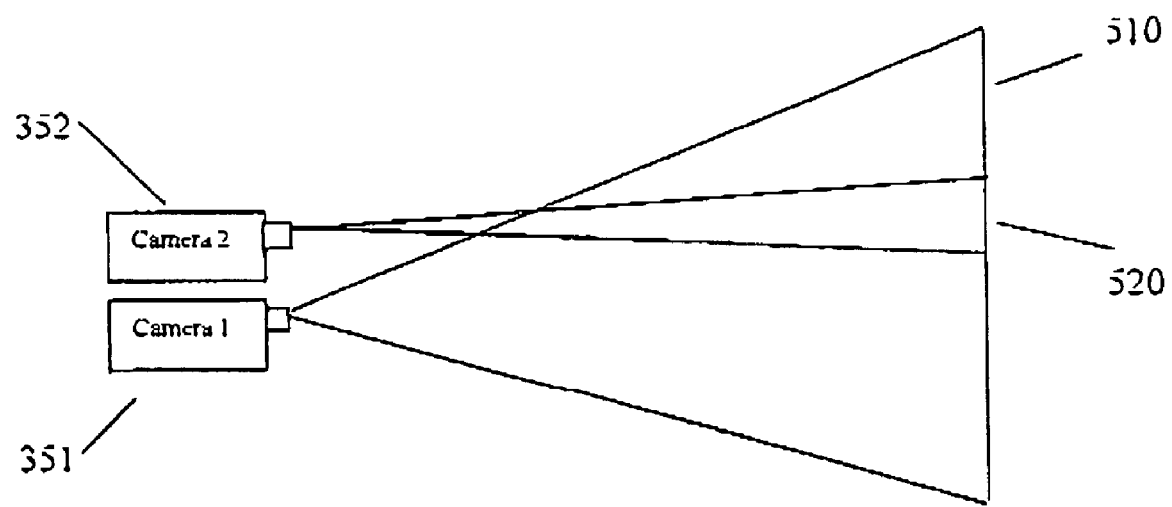
FIG. 5 is a block diagram illustrating the use of two cameras to capture images of a full scene and a region-of-interest in that scene in accordance with an embodiment of the invention.

FIG. 5 is a block diagram illustrating the use of two cameras 351, 352 to capture images of a full scene 510 and a region-of-interest 520 in that scene in accordance with an embodiment of the invention. In FIG. 5, the first camera 351 captures a first image of the full scene 510 (i.e. a context image or representation) at a first resolution while the second camera 352 captures a second image of the region-of-interest 520 (i.e. a detail image or representation) at a second resolution. The first and second resolutions may be equal or one may be greater than the other. It will be understood that more than two cameras may be used. For example, multiple details in a full scene may be captured with multiple cameras.

Figure 6:
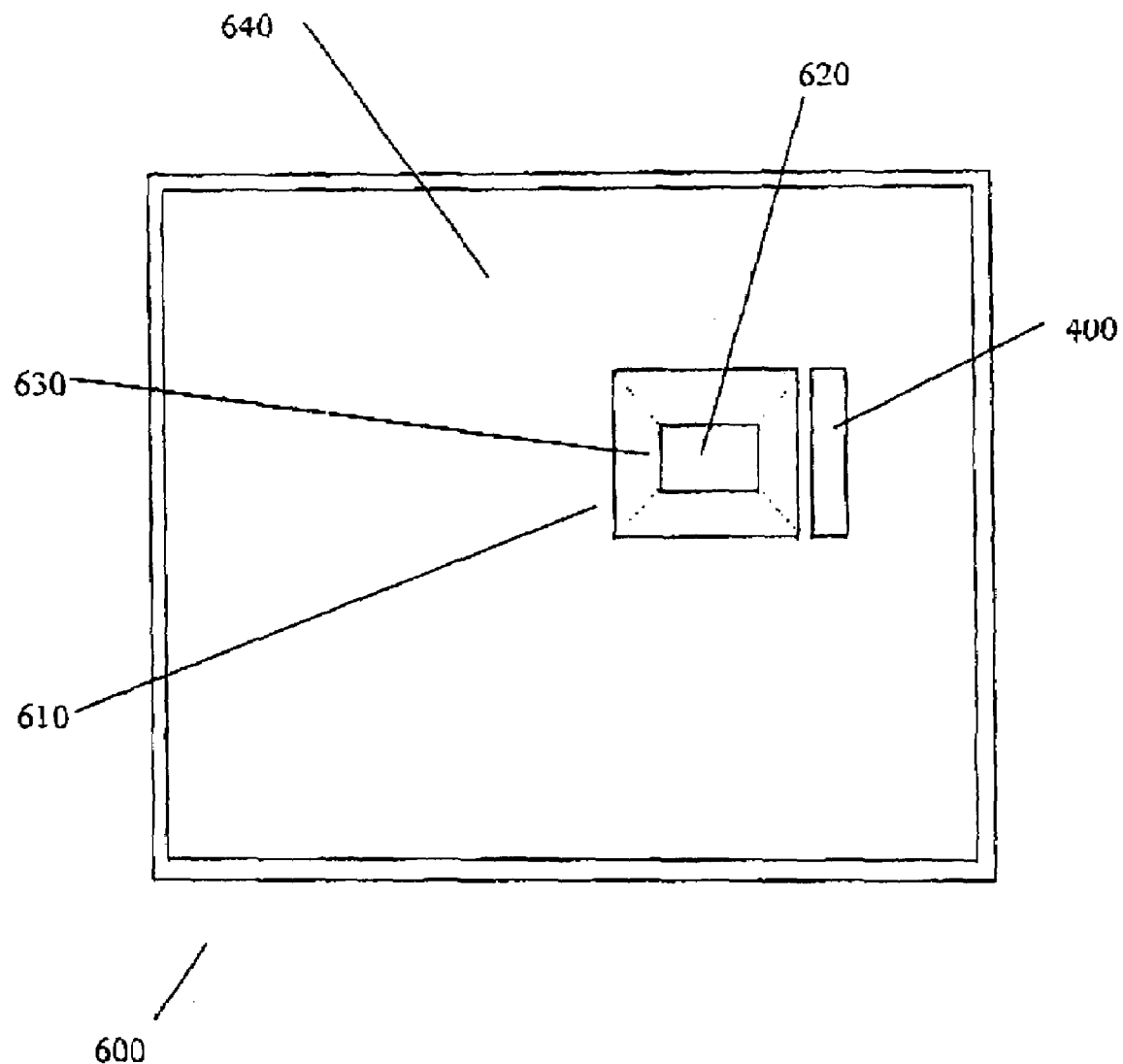
FIG. 6 is a screen capture of a detail-in-context presentation formed by combining an image of the full scene with an image of the region-of-interest from respective video cameras in accordance with an embodiment of the invention.

FIG. 6 is a screen capture of a detail-in-context presentation 600 formed by combining an image of the full scene 640 (i.e. the context image) with an image of the region-of-interest 620 (i.e. the detail image) from respective video cameras 351, 352 in accordance with an embodiment of the invention. In the detail-in-context presentation 600, the region-of-interest image 620 appears as a lens 610 within the image of the full scene 640. The lens 610 may include a shoulder region 630 surrounding the region-of-interest 620 or the lens 610 may be coextensive with the region-of-interest 620 Also shown in FIG. 6 is a GUI 400 for controlling the features of the lens 610 and for controlling the second camera 352. The GUI 400 will be described in greater detail below.

Figure 7:
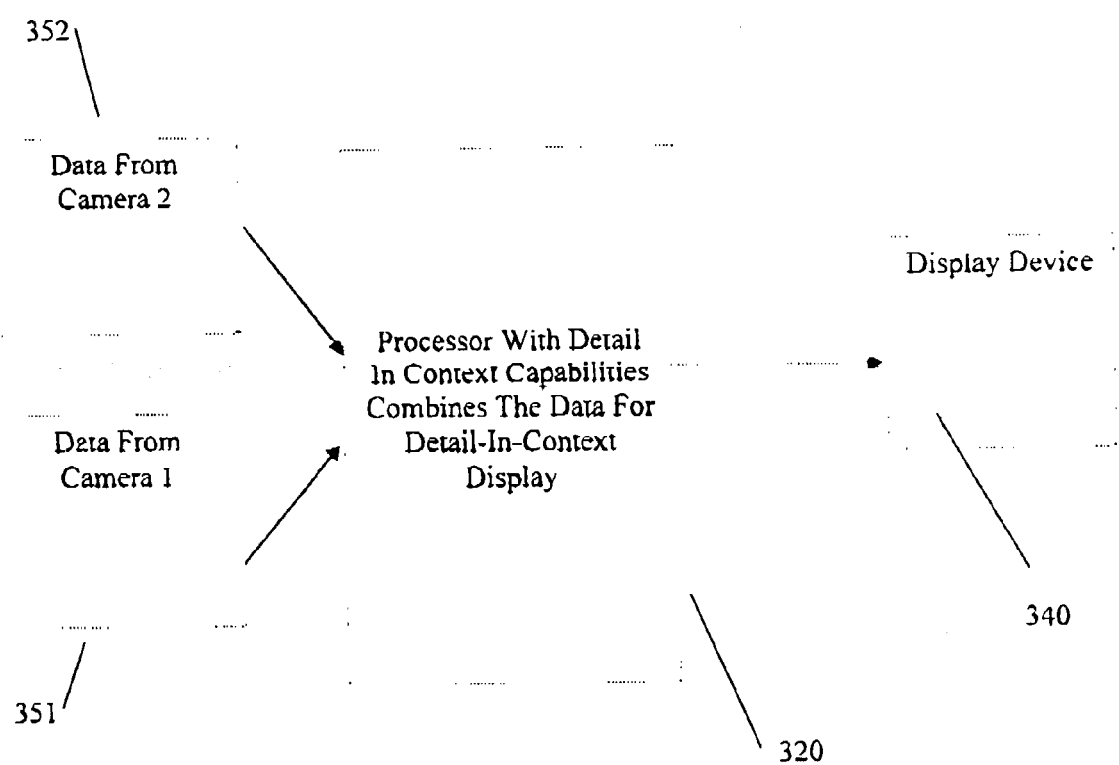
FIG. 7 is a data flow diagram illustrating data flow from video cameras to a display screen in accordance with an embodiment of the invention.

FIG. 7 is a data flow diagram illustrating data flow from video cameras 351, 352 to a display screen 340 in accordance with an embodiment of the invention. Data representing an image of the full scene 640 from the first camera 351 and data representing an image of the region-of-interest 620 from the second camera is received by the CPU 320 of the data processing system 300. Using EPS techniques, the CPU 320 processes the images 640, 620 in accordance with instructions received from the user via an input device 310 and a GUI 400 to produce a detail-in-context presentation 600. The data representing the region-of-interest 620 is treated as the lens (or detail) and the data representing the full scene 640 is treated as the context of the detail-in-context presentation 600. The presentation 600 is presented to the user on a display screen 340. It will be understood that the CPU 320 may apply a transformation to the shoulder region 630 surrounding the region-of-interest 620 to affect blending with or folding over the full scene 640 in accordance with EPS technology. For example, the transformation may map the region-of-interest 620 and/or shoulder region 340 to a predefined lens surface, defined by a transformation or distortion function and having a variety of shapes, using EPS techniques. Or, the lens 610 may be simply coextensive with the region-of-interest 620. Blending and folding of lenses in detail-in-context presentations are described in U.S. Patent Application Publication No. 2002/0,044,154 which is incorporated herein by reference.

Figure 8:
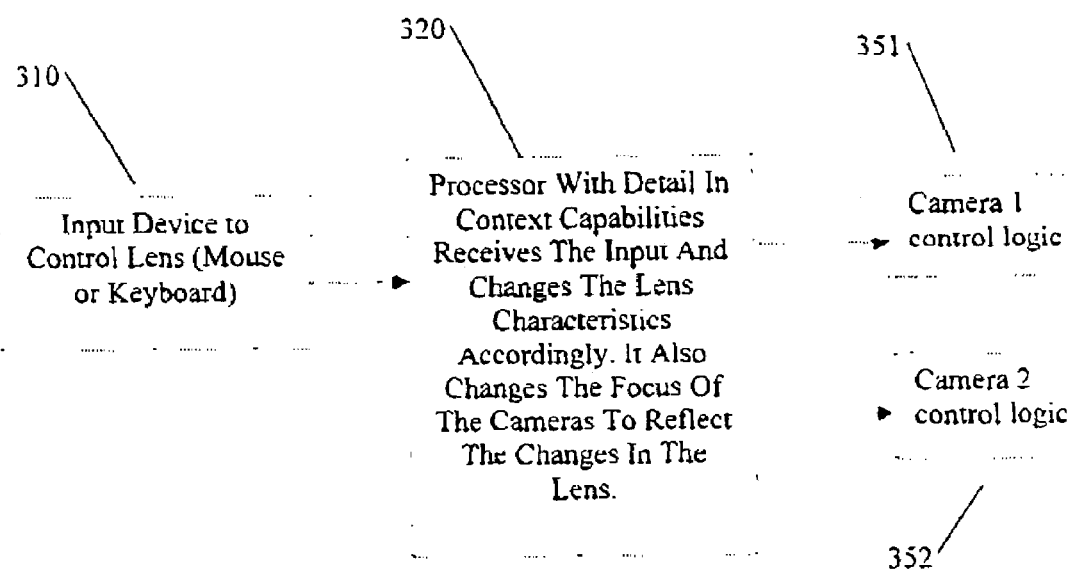
FIG. 8 is a data flow diagram illustrating data flow from an input device to the control logic of the first and second cameras in accordance with an embodiment of the invention; and, FIG. 9 is a flow chart illustrating a method for generating a presentation of a region-of-interest in an image of a scene in accordance with an embodiment of the invention.

FIG. 8 is a data flow diagram illustrating data flow from an input device 310 to the control logic of the first and second cameras 351, 352 in accordance with an embodiment of the invention. Using an input device 310 such as a mouse, a user adjusts parameters of the image of the region-of-interest 620 using the icons and scroll bars of a GUI that is displayed over the image 620 on the display screen 340. The user may also adjust parameters of the image of the full scene 640. Signals representing input device 310 movements and selections are transmitted to the CPU 320 of the data processing system 300 where they are translated into instructions for the control of the video cameras 351, 352. These instructions are then transmitted to the video cameras 351, 352 to affect pan, tilt, zoom, and/or focus operations.

In operation, the data processing system 300 employs EPS techniques with an input device 310 and a GUI 400 to control video cameras 351, 362 to capture detail images 620 and a full scene image 640 which are combined to produce a detail-in-context presentation 600 for display to a user on a display screen 340. A first camera 351 has a field of view that covers a full scene 510 such as a crowd or a parking lot and second camera has a field of view that covers a smaller region-of-interest 520 that is contained within the larger full scene 510. The data or image 640 from the first camera 351 is of lower resolution that that of the second camera but covers a larger area 510. The data from the second camera 352 is of higher resolution than that of the first camera 351 but covers a smaller area 520. The lens control elements of the GUI 400 are adjusted by the user via an input device 310 to control both the characteristics of the lens 610 in the detail-in-context presentation 600 and the cameras 351, 352 used to capture images 620, 640 for the presentation 600. In general, one camera 352 is trained on a region-of-interest 520 in the full scene 510 to supply the high detail images that are presented in the lens 610 of the detail-in-context presentation 600. As will be described below, the zoom level of this camera 352 coincides with the magnification level of the lens 610 and the size of the region-of-interest 520 captured by the camera 352 is defined by the size of the focal region 620 of the lens 610. The GUI 400 allows a user to control the camera 352 in several ways. For example, by moving the lens 610 on the display screen 310 with the GUI 400, the user can change the location of the region-of-interest 520 in the full scene 510 that the camera 352 captures. By resizing the focal region 620 of the lens 610 with the GUI 400, the user can change the size or field of view of the region-of-interest 520 in the full scene that the camera 352 captures. And, by changing the magnification level for the focal region 620 of the lens 610, the user can change the level of zoom of the camera 352.

Advantageously, by using the two cameras 351, 352 to supply data to a detail-in-context presentation 600 a user can view a large area 510 (i.e. outside the lens 610) while focusing in on a smaller area 520 (i.e. inside the focal region 620 of the lens 610). This makes it possible for a user to closely observe objects or persons in the full scene without losing visibility or context of what is happening in the scene surrounding that object or person.

GUI with Lens and Camera Control Elements. As mentioned, detail-in-context presentations of data using techniques such as pliable surfaces, as described by Carpendale, are useful in presenting large amounts of information on limited-size display surfaces. Detail-in-context views allow magnification of a particular region-of-interest (the "focal region") 233 in a data presentation while preserving visibility of the surrounding information 210. In the following, a GUI 400 is described having lens control elements that can be implemented in software and applied to the control of detail-in-context data presentations 600 and to the control of video cameras 351, 352 used to capture detail and context images 620, 640 for these presentations. The software can be loaded into and run by the data processing system 300 of FIG. 3.

Figure 4:
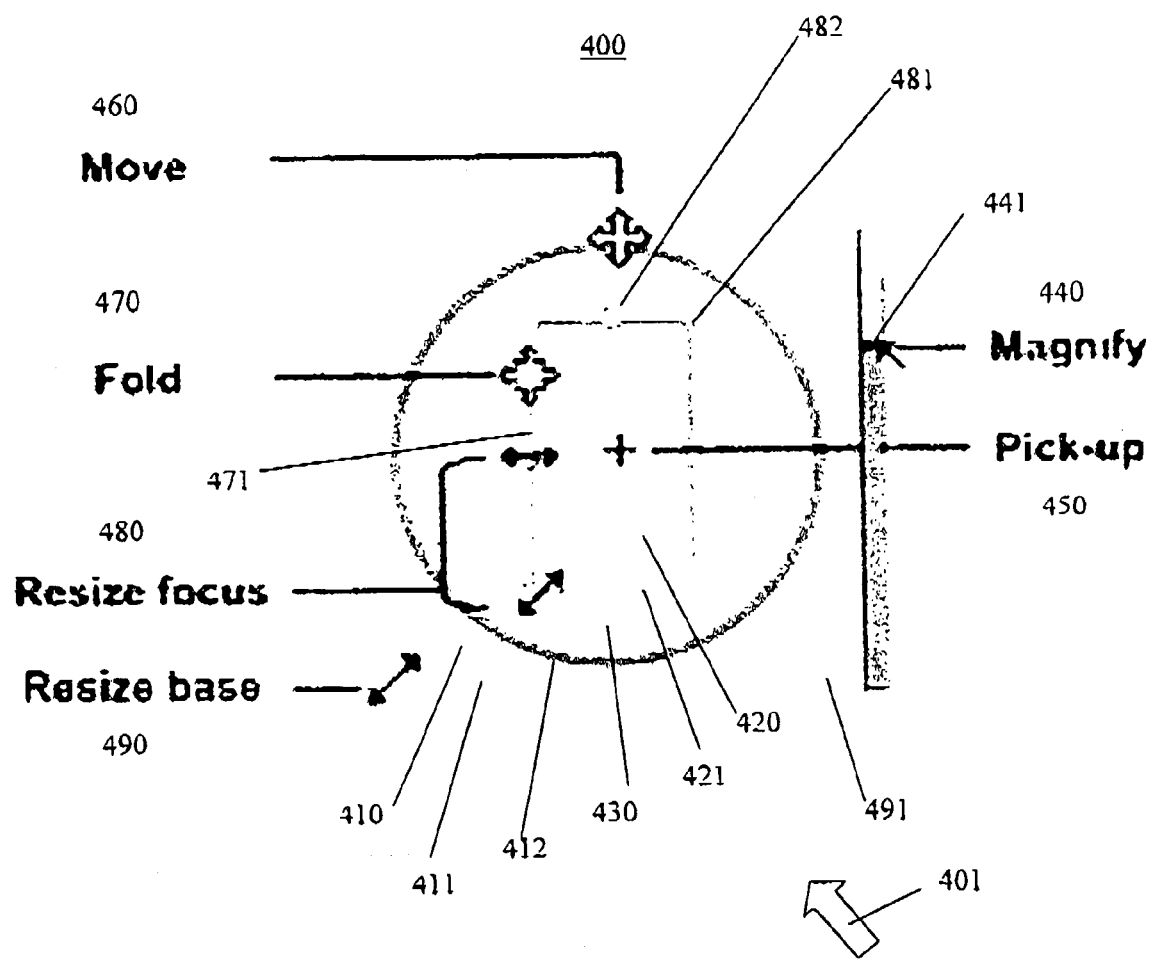
FIG. 4 a partial screen capture illustrating a GUI having lens control elements for user interaction with detail-in-context data presentations in accordance with an embodiment of the invention.

FIG. 4 is a partial screen capture illustrating a GUI 400 having lens control elements for user interaction with detail-in-context data presentations in accordance with an embodiment of the invention. Detail-in-context data presentations are characterized by magnification of areas of an image where detail is desired, in combination with compression of a restricted range of areas of the remaining information (i.e. the context), the end result typically giving the appearance of a lens having been applied to the display screen surface. This lens 410 includes a "focal region" 420 having high magnification, a surrounding "shoulder region" 430 where information is typically visibly compressed, and a "base" 412 surrounding the shoulder region 430 and defining the extent of the lens 410. In FIG. 4, the lens 410 is shown with a circular shaped base 412 (or outline) and with a focal region 420 lying near the center of the lens 410. However, the lens 410 and focal region 420 may have any desired shape. For example, in FIG. 6, the lens 610 has a pyramid shape with a flat top 620 and trapezoidal shoulders 630. As mentioned above, the base of the lens 412 may be coextensive with the focal region 420.

In general, the GUI 400 has lens control elements that, in combination, provide for the interactive control of the lens 410, 610 and corresponding camera 352 control. The effective control of the characteristics of the lens 410 by a user (i.e. dynamic interaction with a detail-in-context lens) is advantageous. Al any given time, one or more of the lens control elements may be made visible to the user on the display surface 340 by appearing as overlay icons on the lens 410. Interaction with each element is performed via the motion of an input or pointing device 310 (e.g. mouse), with the motion resulting in an appropriate change in the corresponding lens characteristic. As will be described, selection of which lens control element is actively controlled by the motion of the pointing device 310 at any given time is determined by the proximity of the icon representing the pointing device 310 (e.g. cursor) on the display surface 340 to the appropriate component of the lens 410. For example, "dragging" of the pointing device at the periphery of the bounding rectangle of the lens base 412 causes a corresponding change in the size of the lens 410 (ie. "resizing"). Thus, the GUI 400 provides the user with a visual representation of which lens control element is being adjusted through the display of one or more corresponding icons.

For ease of understanding, the following discussion will be in the context of using a two-dimensional pointing device 310 that is a mouse, but it will be understood that the invention may be practiced with other 2-D or 3-D (or even greater numbers of dimensions) pointing devices including a trackball and keyboard.

A mouse 310 controls the position of a cursor icon 401 that is displayed on the display screen 340. The cursor 401 is moved by moving the mouse 310 over a flat surface, such as the top of a desk, in the desired direction of movement of the cursor 401. Thus, the two-dimensional movement of the mouse 310 on the flat surface translates into a corresponding two-dimensional movement of the cursor 401 on the display screen 340.

A mouse 310 typically has one or more finger actuated control buttons (i.e. mouse buttons). While the mouse buttons can be used for different functions such as selecting a menu option pointed at by the cursor 401, the disclosed invention may use a single mouse button to "select" a lens 410 and to trace the movement of the cursor 401 along a desired path. Specifically, to select a lens 410, the cursor 401 is first located within the extent of the lens 410. In other words, the cursor 401 is "pointed" at the lens 410. Next, the mouse button is depressed and released. That is, the mouse button is "clicked". Selection is thus a point and click operation. To trace the movement of the cursor 401, the cursor 401 is located at the desired starting location, the mouse button is depressed to signal the computer 320 to activate a icons control element, and the mouse 310 is moved while maintaining the button depressed. After the desired path has been traced, the mouse button is released. This procedure is often referred to as "clicking" and "dragging" (i.e. a click and drag operation). It will be understood that a predetermined key on a keyboard 310 could also be used to activate a mouse click or drag. In the following, the term "clicking" will refer to the depression of a mouse button indicating a selection by the user and the term "dragging" will refer to the subsequent motion of the mouse 310 and cursor 401 without the release of the mouse button.

The GUI 400 may include the following lens control elements: move, pickup, resize base, resize focus, fold, and magnify. Each of these lens control elements has at least one lens control icon or alternate cursor icon associated with it. In general, when a lens 410 is selected by a user through a point and click operation, the following lens control icons may be displayed over the lens 410: pickup icon 450, base outline icon 412, base bounding rectangle icon 411, focal region bounding rectangle icon 421, handle icons 481, 482, 491, and magnify slide bar icon 440. Typically, these icons are displayed simultaneously after selection of the lens 410. In addition, when the cursor 401 is located within the extent of a selected lens 410, an alternate cursor icon 460, 470, 480, 490 may be displayed over the lens 410 to replace the cursor 401 or may be displayed in combination with the cursor 401. These lens control elements, corresponding icons, and their effects on the characteristics of a lens 410 are described below with reference to FIG. 4.

In general, when a lens 410 is selected by a point and click operation, bounding rectangle icons 411, 421 are displayed surrounding the base 412 and focal region 420 of the selected lens 410 to indicate that the lens 410 has been selected. With respect to the bounding rectangles 411, 421 one might view them as glass windows enclosing the lens base 412 and focal region 420, respectively. The bounding rectangles 411, 421 include handle icons 481, 482, 491 allowing for direct manipulation of the enclosed base 412 and focal region 420 as will be explained below. Thus, the bounding rectangles 411, 421 not only inform the user that the lens 410 has been selected, but also provide the user with indications as to what manipulation operations might be possible for the selected lens 410 though use of the displayed handles 481, 482, 491. Note that it is well within the scope of the present invention to provide a bounding region having a shape other than generally rectangular. Such a bounding region could be of any of a real number of shapes including oblong, oval, ovoid, conical, cubic, cylindrical, polyhedral, spherical, etc.

Moreover, the cursor 401 provides a visual cue indicating the nature of an available lens control element. As such, the cursor 401 will generally change in form by simply pointing to a different lens control icon 450, 412, 411, 421, 481, 482, 491, 440. For example, when resizing, the base 412 of a lens 410 using a corner handle 491, the cursor 401 will change form to a resize icon 490 once it is pointed at (i.e. positioned over) the corner handle 491. The cursor 401 will remain in the form of the resize icon 490 until the cursor 401 has been moved away from the corner handle 491.

Move. Lateral movement of a lens 410 is provided by the move lens control element of the GUI. This functionality is accomplished by the user first selecting the lens 410 through a point and click operation. Then, the user points to a point within the lens 410 that is other than a point lying on a lens control icon 450, 412, 411, 421, 481, 482, 491, 440. When the cursor 401 is so located, a move icon 460 is displayed over the lens 410 to replace the cursor 401 or may be displayed in combination with the cursor 401. The move icon 460 not only informs the user that the lens 410 may be moved, but also provides the user with indications as to what movement operations are possible for the selected lens 410. For example, the move. icon 460 may include arrowheads indicating up, down, left, and night motion. Next, the lens 410 is moved by a click and drag operation in which the user clicks and drags the lens 410 to the desired position on the screen 340 and then releases the mouse button 310. The lens 410 is locked in its new position until a further pickup and move operation is performed. Corresponding to this move operation the data processing system 300 generates instructions to control the camera 352 to train on the path leading to the new region-of-interest 520 in the full scene 510.

Pickup. Lateral movement of a lens 410 is also provided by the pickup lens control element of the GUI. This functionality is accomplished by the user first selecting the lens 410 through a point and click operation. As mentioned above, when the lens 410 is selected a pickup icon 450 is displayed over the lens 410 near the centre of the lens 410. Typically, the pickup icon 450 will be a crosshairs in addition, a base outline 412 is displayed over the lens 410 representing the base 412 of the lens 410. The crosshairs 450 and lens outline 412 not only inform the user that the lens has been selected, but also provides the user with an indication as to the pickup operation that is possible for the selected lens 410. Next, the user points at the crosshairs 450 with the cursor 401. Then, the lens outline 412 is moved by a click and drag operation in which the user clicks and drags the crosshairs 450 to the desired position on the screen 340 and then releases the mouse button 310. The full lens 410 is then moved to the new position and is locked there until a further pickup operation is performed. In contrast to the move operation described above, with the pickup operation, it is the outline 412 of the lens 410 that the user repositions rather than the fill lens 410. Corresponding to this pickup operation, the data processing system 300 generates instructions to control the camera 352 to train on the new region-of-interest 520 in the full scene 510.

Resize Base. Resizing of the base 412 (or outline) of a lens 410 is provided by the resize base lens control element of the GUI. After the lens 410 is selected, a bounding rectangle icon 411 is displayed surrounding the base 412. The bounding rectangle 411 includes handles 491. These handles 491 can be used to stretch the base 412 taller or shorter, wider or narrower, or proportionally larger or smaller. The corner handles 491 will keep the proportions the same while changing the size. The middle handles (not shown) will make the base 412 taller or shorter, wider or narrower. Resizing the base 412 by the corner handles 491 will keep the base 412 in proportion. Resizing the base 412 by the middle handles (not shown) will chance the proportions of the base 412. That is, the middle handles (not shown) change the aspect ratio of the base 412 (i.e. the ratio between the height and the width of the bounding rectangle 411 of the base 412). When a user points at a handle 491 with the cursor 401 a resize icon 490 may be displayed over the handle 491 to replace the cursor 401 or may be displayed in combination with the cursor 401. The resize icon 490 not only informs the user that the handle 491 may be selected but also provides the user with indications as to the resizing operations that are possible with the selected handle. For example, the resize icon 490 for a corner handle 491 may include arrows indicating proportional resizing. The resize icon (not shown) for a middle handle (not shown) may include arrows indicating width resizing or height resizing.

After pointing at the desired handle 491, the user would click and drag the handle 491 until the desired shape and size for the base 412 is reached. Once the desired shape and size are reached, the user would release the mouse button 310. The base 412 of the lens 410 is then locked in its new size and shape until a further base resize operation is performed.

Resize Focus. Resizing of the focal region 420 of a lens 410 is provided by the resize focus lens control element of the GUI. After the lens 410 is selected a bounding rectangle icon 421 is displayed surrounding the focal region 420. The bounding rectangle 421 includes handles 481 482. These handles 481, 482 can be used to stretch the focal region 420 taller or shorter, wider or narrower, or proportionally larger or smaller. The corner handles 481 will keep the proportions the same while changing the size. The middle handles 482 will make the focal region 420 taller or shorter, wider or narrower. Resizing the focal region 420 by the corner handles 481 will keep the focal region 420 in proportion. Resizing the focal region 420 by the middle handles 482 will change the proportions of the focal region 420. That is, the middle handles 482 change the aspect ratio of the focal region 420 (i.e. the ratio between the height and the width of the bounding rectangle 421 of the focal region 420). When a user points at a handle 481, 482 with the cursor 401 a resize icon 480 may be displayed over the handle 481, 482 to replace the cursor 401 or may be displayed in combination with the cursor 401. The resize icon 480 not only informs the user that a handle 481, 482 may be selected, but also provides the user with indications as to the resizing operations that are possible with the selected handle. For example, the resize icon 480 for a corner handle 481 may include arrows indicating proportional resizing. The resize icon 480 for a middle handle 482 may include arrows indicating width resizing or height resizing. After pointing at the desired handle 481, 482, the user would click and drag the handle 481, 482 until the desired shape and size for the focal region 420 is reached. Once the desired shape and size are reached, the user would release the mouse button 310. The focal region 420 is then locked in its new size and shape until a further focus resize operation is performed. Corresponding to this resize focal region operation, the data processing system 300 generates instructions to control the camera 352 to adjust its field of vies thus changing the area of the region-of-interest 520 in the full scene 510.

Fold. Folding of the focal region 420 of a lens 410 is provided by the fold control element of the GUI. In general, control of the degree and direction of folding (i.e. skewing of the viewer aligned vector 231 as described by Carpendale) is accomplished by a click and drag operation on a point 471, other than a handle 481, 482, on the bounding rectangle 421 surrounding the focal region 420. The direction of folding is determined by the direction in which the point 471 is dragged The degree of folding is determined by the magnitude of the translation of the cursor 401 during the drag. In general, the direction and degree of folding corresponds to the relative displacement of the focus 420 with respect to the lens base 410. In other words, and referring to FIG. 2, the direction and degree of folding corresponds to the displacement of the point FP 233 relative to the point FPo 232, where the vector joining the points FPo 232 and FP 233 defines the viewer aligned vector 231. In particular, after the lens 410 is selected, a bounding rectangle icon 421 is displayed surrounding the focal region 420. The bounding rectangle 421 includes handles 481, 482. When a user points at a point 471, other than a handle 481, 482, on the bounding rectangle 421 surrounding the focal region 420 with the cursor 401, a fold icon 470 may be displayed over the point 471 to replace the cursor 401 or may be displayed in combination with the cursor 401.

The fold icon 470 not only informs the user that a point 471 on the bounding rectangle 421 may be selected, but also provides the user with indications as to what fold operations are possible. For example, the fold icon 470 may include arrowheads indicating up, down, left, and right motion. By choosing a point 471, other than a handle 481, 482, on the bounding rectangle 421 a user may control the degree and direction of folding. To control the direction of folding, the user would click on the point 471 and drag in the desired direction of folding. To control the degree of folding, the user would drag to a greater or lesser degree in the desired direction of folding. Once the desired direction and degree of folding is reached, the user would release the mouse button 310. The lens 410 is then locked with the selected fold until a further fold operation is performed.

Magnify. Magnification of the lens 410 is provided by the magnify lens control element of the GUI. After the lens 410 is selected, the magnify control is presented to the user as a slide bar icon 440 near or adjacent to the lens 410 and typically to one side of the lens 410. Sliding the bar 441 of the slide bar 440 results in a proportional change in the magnification of the lens 410. The slide bar 440 not only informs the user. That magnification of the lens 410 may be selected, but also provides the user with an indication as to what level of magnification is possible. The slide bar 440 includes a bar 441 that may be slid up and down, or left and right, to adjust and indicate the level of magnification. To control the level of magnification, the user would click on the bar 441 of the slide bar 440 and drag in the direction of desired magnification level. Once the desired level of magnification is reached, the user would release the mouse button 310. The lens 410 is then locked with the selected magnification until a further magnification operation is performed. In general, the focal region 420 is an area of the lens 410 having constant magnification (i.e. if the focal region is a plane). Again referring to FIGS. 1 and 2, magnification of the focal region 420, 233 varies inversely with the distance from the focal region 420, 233 to the reference view plane (RVP) 201. Magnification of areas lying in the shoulder region 430 of the lens 410 also varies inversely with their distance from the RVP 201. Thus, magnification of areas lying in the shoulder region 430 will range from unity at the base 412 to the level of magnification of the focal region 420. Corresponding to this magnify operation, the data processing, system 300 generates instructions to control the camera 352 to adjust its zoom level thus changing the level of magnification of the region-of-interest 520 in the full scene 510. While not shown in FIG. 4, the GUI 400 may also include a slide bar icon for camera lens focusing in the event that auto-focusing cameras are not used.

Icon Hiding. Advantageously, a user may choose to hide one or more lens control icons 450, 412, 411, 421, 481, 482, 491, 440 shown in FIG. 4 from view so as not to impede the user's view of the image within the lens 410. This may be helpful, for example, during a move operation. A user may select this option through means such as a menu or lens property dialog box.

Figure 9:
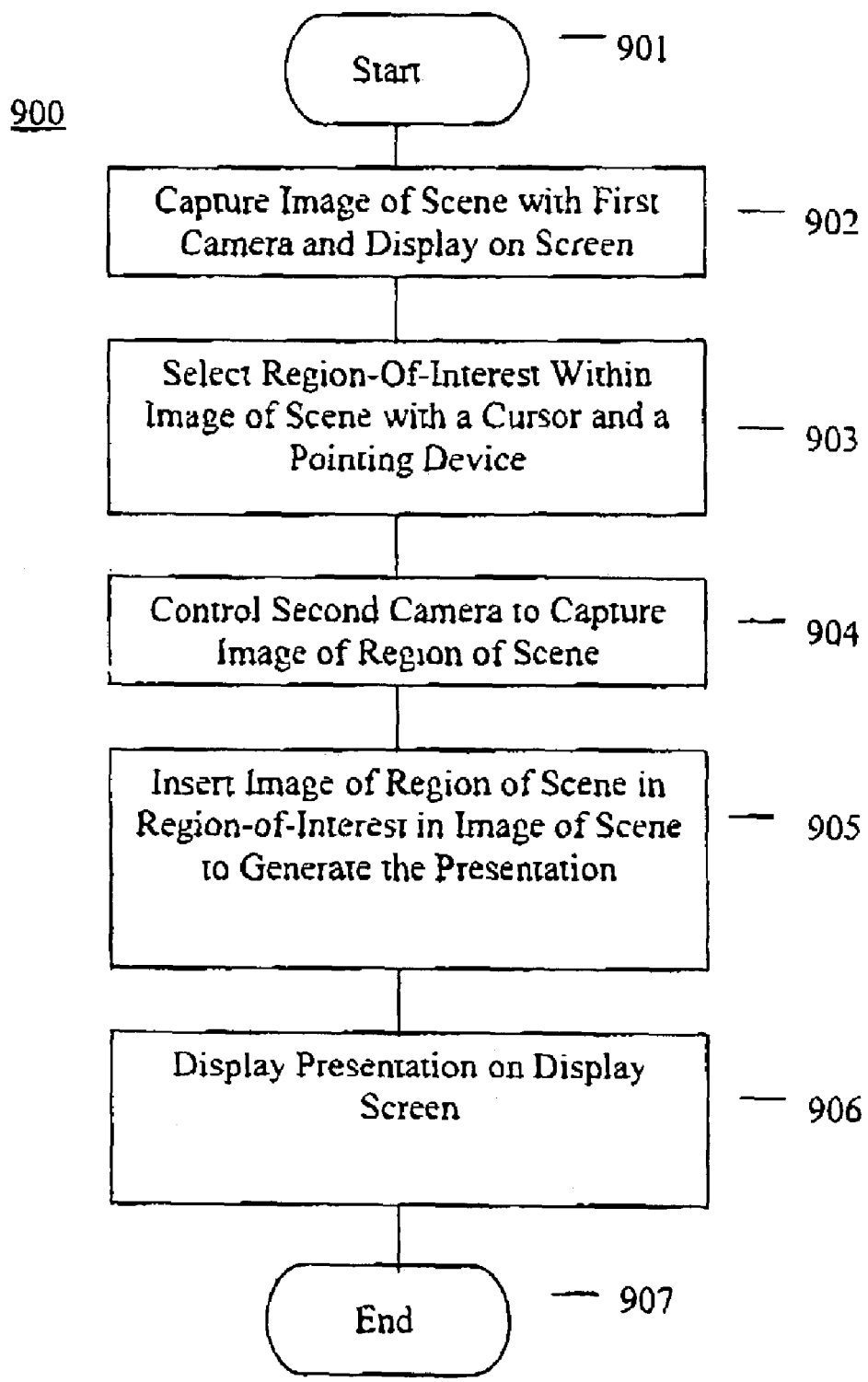

Method. FIG. 9 is a flow chart 900 illustrating a method for generating a presentation 600 of a region-of-interest 620 in an image of a scene 640 in accordance with an embodiment of the invention. At step 901, the method starts. At step 902, the image of the scene is captured with a first camera and displayed on a display screen. At step 903, the region-of-interest within the image of the scene is selected with a cursor and a pointing device. At step 904, a second camera is controlled to capture an image of a region of the scene corresponding to the region-of-interest.

At step 905, the image of the region is inserted into the region-of-interest in the image of the scene to generate the presentation. At step 906, the presentation is displayed on the display screen. AI step 907, the method ends.

Data Carrier Producer. The sequences of instructions which when executed cause the method described herein to be performed by the exemplary data processing system of FIG. 3 can be contained in a data carrier product according to one embodiment of the invention. This data carrier product can be loaded into and run by the exemplary data processing system of FIG. 3.

Computer Software Product. The sequences of instructions which when executed cause the method described herein to be performed by the exemplary data processing system of FIG. 3 can be contained in a computer software product according to one embodiment of the invention. This computer software product can be loaded into and run by the exemplary data processing system of FIG. 3.

Integrated Circuit Product. The sequences of instructions which when executed cause the method described herein to be performed by the exemplary data processing system of FIG. 3 can be contained in an integrated circuit product including a coprocessor or memory according to one embodiment of the invention. This integrated circuit product can be installed in the exemplary data processing system of FIG. 3.

Although preferred embodiments of the invention have been described herein, it will be understood by those skilled in the art that variations may be made thereto without departing from the spirit of the invention or the scope of the appended claims.

The invention claimed is:

1. A method for generating a presentation of a region-of-interest in an image of a scene comprising the steps of:
   capturing said image of said scene with a first camera and displaying said image of said scene on a display screen;
   selecting said region-of-interest within said image of said scene with a cursor and a pointing device;
   controlling a second camera to capture an image of a region of said scene corresponding to said region-of-interest;
   inserting said image of said region into said region-of-interest in said image of said scene to generate said presentation; and,
   displaying said presentation on said display screen;
   wherein said step of controlling further includes the steps of:
      displaying a graphical user interface ("GUI") over said region-of-interest on said display screen, wherein said GUI includes magnify, resize, and move areas;
      zooming said second camera when said magnify area is selected and repositioned by said pointing device;
      adjusting said second camera's field of view when said resize area is selected and repositioned by said pointing device; and,
      panning and/or tilting said second camera when said move area is selected and repositioned by said pointing device;
   wherein said region-of-interest has a focal region and a shoulder region surrounding said focal region;
   wherein said resize area includes a first bounding shape surrounding said focal region, said first bounding shape having at least two active areas, said active areas for resizing said focal region by repositioning at least one of said active areas with said pointing device; and,
   wherein said resize area further includes a second bounding shape surrounding said shoulder region, said second bounding shape having at least two active areas, said active areas for resizing said shoulder region by repositioning at least one of said active areas with said pointing device.

2. The method of claim 1 and further comprising the steps of:
creating a lens surface for said region-of-interest; and,
transforming said image of said region by applying a distortion function defining said lens surface to said image of said region.

3. The method of claim 1 wherein said active areas of said first bounding shape are for folding said focal region by repositioning at least one of said active areas with said pointing device.

4. The method of claim 1 wherein said GUI has a base outline, said base outline positioned within said second bounding shape, said base outline outlining said shoulder region.

5. The method of claim 4 wherein said magnify area is a slide bar, said slide bar having at least one active area, said active area for magnifying said region-of-interest by repositioning said active area with said pointing device.

6. The method of claim 5 wherein said move area has at least one active area, said move area located within region-of-interest, said active area for moving said region-of-interest by repositioning said active area with said pointing device.

7. The method of claim 6 wherein said first and second bounding shapes are rectangles.

8. The method of claim 7 wherein one of said active areas is a corner-handle icon positioned over a corner of said first bounding shape.

9. The method of claim 8 wherein one of said active areas is a middle-handle icon positioned over said first bounding shape between corners of said first bounding shape.

10. The method of claim 9 wherein one of said active areas is a corner-handle icon positioned over a corner of said second bounding shape.

11. The method of claim 10 wherein one of said active areas is a middle-handle icon positioned over said second bounding shape between corners of said second bounding shape.

12. The method of claim 11 wherein said move area has at least one pickup point, said pickup point having at least one active area, said active area for moving said base outline and subsequently said region-of-interest by repositioning said active area with said pointing device.

13. The method of claim 12 wherein said pickup point is located centrally in said region-of-interest.

14. The method of claim 13 wherein said move area excludes said first bounding shape, said second bounding shape, and said pickup point.

15. The method of claim 14 wherein one of said active areas is a pickup icon positioned over said pickup point.

16. The method of claim 15 wherein one of said active areas is a bar icon positioned over said slide bar.

17. The method of claim 16 wherein said cursor changes shape when positioned over one of said active areas.

18. The method of claim 17 wherein said cursor chances said shape to a resize icon when positioned over said corner-handle icon or said middle-handle icon.

19. The method of claim 18 wherein said cursor changes said shape to a move icon when positioned over said move area.

20. The method of claim 1 wherein said pointing device is a mouse.

21. The method of claim 1 for use in a video camera security system.

22. The method of claim 1 wherein said region-of-interest, said second camera, and said image of said region are a plurality of regions-of-interest, a plurality of second cameras, and a plurality of images of said region, respectively.

* * * * *

UNITED STATES PATENT AND TRADEMARK OFFICE
CERTIFICATE OF CORRECTION

PATENT NO.         : 7,411,610 B2
APPLICATION NO. : 10/435675
DATED                  : August 12, 2008
INVENTOR(S)       : Michael Doyle It is certified that error appears in the above-identified patent and that said Letters Patent is hereby corrected as shown below:

Specification, column 1, line 29: Insert the word --a-- before the word "selected".

Specification, column 1, line 43: Replace the word "to" with the word --of--.

Specification, column 2, line 2: Insert the word --the-- before the word "full".

Specification, column 3, line 41: Insert the word --is-- after the number "4".

Specification, column 5, line 54: Replace the word "derail" with the word --detail--.

Specification, column 6, line 39: Insert a period after the word "System".

Specification, column 7, line 6: Delete the period after the word "data".

Specification, column 7, line 34: Insert a period after the number "620".

Specification, column 9, line 26: Replace the word "Al with the word --At--.

Specification, column 10, line 4: Replace the word "icons" with the word --lens--.

Specification, column 11, line 54: Replace the word "chance" with the word --change--.

Specification, column 12, line 51: Insert a period after the word "dragged".

Specification, column 13, line 22: Delete the period after the word "user".

Specification, column 13, line 22: Replace the word "That" with the word --that--.

UNITED STATES PATENT AND TRADEMARK OFFICE
CERTIFICATE OF CORRECTION

PATENT NO. : 7,411,610 B2
APPLICATION NO. : 10/435675
DATED : August 12, 2008
INVENTOR(S) : Michael Doyle It is certified that error appears in the above-identified patent and that said Letters Patent is hereby corrected as shown below:

Specification, column 14, line 4: Replace the word "Al" with the word --At--.

Claim 18, column 16, line 21: Replace the word "chances" with the word --changes--.

Signed and Sealed this

Thirtieth Day of September, 2008

JON W. DUDAS
*Director of the United States Patent and Trademark Office*